US012647174B2

(12) United States Patent
Jayawardene et al.

(10) Patent No.: US 12,647,174 B2
(45) Date of Patent: Jun. 2, 2026

(54) COMMUNICATION CONTROL BASED ON FEEDBACK FROM REPEATER WIRELESS STATION

(71) Applicant: Charter Communications Operating, LLC, St. Louis, MO (US)

(72) Inventors: Diwelawatte P. Jayawardene, Centennial, CO (US); Rajeev Aggarwal, Aurora, CO (US); Manthan A. Shah, Lone Tree, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 468 days.

(21) Appl. No.: 18/115,019

(22) Filed: Feb. 28, 2023

(65) Prior Publication Data

US 2024/0291552 A1 Aug. 29, 2024

(51) Int. Cl.
*H04B 7/155* (2006.01)
*H04L 1/00* (2006.01)

(52) U.S. Cl.
CPC ....... *H04B 7/15507* (2013.01); *H04L 1/0003* (2013.01)

(58) Field of Classification Search
CPC ....... H04B 7/15507; H04B 7/155; H04B 7/14
See application file for complete search history.

(56) References Cited

U.S. PATENT DOCUMENTS

| | | | | | |
|---|---|---|---|---|---|
| 2008/0298296 | A1* | 12/2008 | Wu | ...................... | H04L 27/0008 370/312 |
| 2010/0098045 | A1* | 4/2010 | Miyazaki | .............. | H04L 1/0033 370/342 |
| 2013/0279364 | A1* | 10/2013 | Nagata | ................... | H04B 7/155 370/252 |
| 2014/0341200 | A1* | 11/2014 | Vukich | ................. | H04W 48/16 370/338 |
| 2015/0071267 | A1* | 3/2015 | Wu | ........................ | H04W 52/48 370/336 |
| 2021/0409106 | A1* | 12/2021 | Ashworth | ............... | H04L 5/143 |
| 2023/0087814 | A1* | 3/2023 | Sevindik | ........... | H04B 7/15535 370/278 |

FOREIGN PATENT DOCUMENTS

| | | | | | |
|---|---|---|---|---|---|
| EP | | 1898562 A2 * | 3/2008 | ............. | H04B 7/155 |

OTHER PUBLICATIONS

GB 2414904 A), Byron, Method of Positioning a Repeater Within a Cell of a Telecommunications Network, Jul. 2005, pp. 1-8 (Year: 2005).*
2008154844 A1),Li et al.,A Method for Supporting a Mobile Station to Carry out Ranging and Corresponding Base Station and Relay Station, Dec. 2008, pp. 1-32 (Year: 2008).*

* cited by examiner

*Primary Examiner* — Keith Ferguson
(74) *Attorney, Agent, or Firm* — Armis IP Law, LLC

(57) ABSTRACT

A communication management resource detects wireless connectivity of user equipment with a repeater wireless station. The communication management resource receives feedback from the user equipment. The feedback indicates a quality of the user equipment receiving wireless signals transmitted from the repeater wireless station over the wireless connectivity. Based on multiple samples of the received feedback, the communication management resource controls transmission of the wireless signals from the repeater wireless station to the user equipment.

27 Claims, 10 Drawing Sheets

COMMUNICATION CONTROL BASED ON FEEDBACK FROM REPEATER WIRELESS STATION

BACKGROUND

Conventional wireless networks typically include multiple wireless base stations and potentially one or more so-called repeater while stations. In general, a repeater wireless station is configured to receive a wireless signal from a main wireless base station and then, as its name suggests, implement a repeating process of further transmitting wireless signal. For example, the repeater wireless station receives the wireless signal and transmits a copy of the received wireless signal in a wireless network environment. Thus a respective repeater wireless station can be configured to provide additional wireless coverage on behalf of the main wireless base station.

Further, note that conventional wireless networks typically include one or more wireless base stations to provide mobile communication devices access to a remote network such as the Internet. One type of base station is a so-called CBSD (Citizen Broadband Radio Service Device). Such a device uses one or more wireless channels allocated from a CBRS (Citizens Band Radio Service) band to support communications with one or more mobile communication devices. Typically, the one or more wireless channels are allocated to the base station via a so-called SAS (Spectrum Access System).

Subsequent to registration and wireless channel allocation, the wireless base station communicates so-called heartbeat request messages to the spectrum access system in order to continue use of the allocated one or more wireless channels. For example, the customer premises equipment is able to continue using the allocated wireless channel for an appropriate duration each time the SAS communicates a heartbeat response to the customer premises equipment.

In a CBRS system, as previously discussed, the SAS (Spectrum Access System) is used to allocate (authorize/unauthorize) radio resources to CBSDs based on a request from a CBSD; the spectrum allocation/grant to the CBSD can be in a chunks of 10 MHz or 20 MHz and up to 100 MHz assuming LTE (Long Term Evolution) operation.

It is further noted that, according to conventional wireless systems such as including one or more wireless base stations, FR2 NR (such as millimeter wave of higher than 24 GHz) is also referred to as the high frequency bands, which are extended bands for 5G. There are excessive spectrum resources available in FR2, which provide significant capacity boost both in DL (downlink) and UL (uplink) in LOS (Line Of Site) conditions.

Thus, in general, conventional repeater wireless stations can be configured to extend coverage of frequency band FR2 (such as 24.25 GHz to 71.0 GHz) even in non-line-of-sight conditions from a gNB within a service footprint of a CBRS. However, it is noted that the user service speed (throughput bandwidth of such wireless signals) as seen in all commercial systems typically fluctuates over time.

BRIEF DESCRIPTION OF EMBODIMENTS

Embodiments herein include providing improved techniques of supporting wireless connectivity between a wireless base station through a repeater wireless station and one or more mobile communication devices. For example, the techniques for as discussed herein provide better service consistency of supporting uplink and downlink communications during conditions in which a respective mobile communication device is served by a repeater wireless station. Note that the wireless system as described herein can be implemented at the 5G gNB or any other wireless system. The wireless system as described herein can be implemented in any suitable frequency band such as including CBRS band, frequency band FR1 (4.1 GHz to 7.125 GHz), frequency band FR2 (such as 24.25 GHz to 71.0 GHz), etc.

More specifically, in accordance with one example, a communication management resource in a network environment detects wireless connectivity of user equipment with a repeater wireless station. The communication management resource receives feedback from the user equipment; the feedback indicates a quality of the user equipment receiving wireless signals transmitted from the repeater wireless station over the wireless connectivity. As discussed herein, based on multiple samples of the received feedback, the communication management resource controls transmission of the wireless signals from the repeater wireless station to the user equipment.

In accordance with further examples, the communication management resource can be configured to control transmission of the wireless signals from the repeater wireless station via controlling a modulation coding scheme of communicating the wireless signals from the repeater wireless station to the user equipment. For example, the communication management resource can be configured to select an appropriate modulation coding scheme and use that selected modulation coding scheme to transmit wireless communications from the wireless base station in accordance with the selected modulation coding scheme to the repeater wireless station. As its name suggests, the repeater wireless station further repeats transmissions of the wireless communications from the wireless base station as replica wireless signals communicated to the user equipment.

Still further, controlled transmission of the wireless signals from the repeater wireless station to the user equipment as discussed herein includes selection of a modulation coding scheme in which to transmit wireless communications from the wireless base station to the repeater wireless station. The repeater wireless station repeats transmission of the wireless communications as replica wireless signals to the user equipment.

In accordance with yet further examples as discussed herein, the communication management resource can be configured to adjust a modulation coding scheme associated with the wireless signals in response to detecting that a variation in magnitudes of the multiple samples of the received feedback is above a threshold level (threshold range).

As further discussed herein, the feedback from the user equipment as received from the repeater wireless station may significantly vary over time, especially during movement of the user equipment with respect to the repeater wireless station. As an example, the channel quality information feedback may be or be based on a signal to noise ratio associated with the user equipment receiving a wireless message from the repeater wireless station over the wireless connectivity. For example, the multiple samples of the received feedback can be configured to indicate a change, over time, in a signal to noise ratio of the user equipment receiving the wireless signals from the repeater wireless station.

Yet further, the communication management resource can be configured to determine a travel time of conveying a wireless communication between a wireless base station and the user equipment. The wireless communication conveyed over a communication path including the repeater wireless station and the wireless connectivity. The communication management resource uses the travel time to determine a change in a distance between the user equipment and the repeater wireless station. The determined distance may be used as a factor to select an appropriate modulation coding scheme in which to communicate in a downlink direction from the wireless base station through the repeater wireless station to the user equipment.

In still further example embodiments, controlled transmission of the wireless signals from the wireless base station includes the communication management resource analyzing samples of the feedback received within multiple different windows of time. For example, based on first samples of the feedback received in a first window of time, the communication management resource selects a first modulation coding scheme in which to communicate in the downlink from the wireless base station through the repeater wireless station to the user equipment; based on second samples of the feedback received in a second window of time, the communication management resource selects a second modulation coding scheme in which to communicate in the downlink from the wireless base station through the repeater wireless station to the user equipment; based on third samples of the feedback received in a third window of time, the communication management resource selects a third modulation coding scheme in which to communicate in the downlink from the wireless base station through the repeater wireless station to the user equipment; and so on.

Accordingly, embodiments herein include controlling transmission of the wireless signals from the repeater wireless station to the user equipment includes: selecting a modulation coding scheme based on multiple samples of the received feedback over a window of time. The communication management resource then transmits wireless communications from a wireless base station in accordance with the selected modulation coding scheme in which the repeater wireless station repeats the wireless communications received from the wireless base station as replica wireless signals transmitted from the repeater wireless station to the user equipment.

Note that the wireless base station, the repeater wireless station, and the user equipment can be configured to communicate in any of one or more communication bands and any wireless communication protocol. For example, the wireless base station, repeater wireless station, and the user equipment can be configured to communicate in any of one or more wireless communication bands (or at respective wireless carrier frequencies) such as FR1, FR2, etc.

As previously discussed, the implementation of a selected modulation coding scheme based on feedback from user equipment in communication with the repeater wireless station provides a more stable downlink from a wireless base station through a repeater wireless station to target user equipment.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate location detection and allocation of one or more wireless channels in a network environment. The instructions, when executed by computer processor hardware, cause the computer processor hardware (such as one or more co-located or disparately processor devices or hardware) to: detect wireless connectivity of user equipment with a repeater wireless station; receive feedback from the user equipment, the feedback indicating a quality of the user equipment receiving wireless signals transmitted from the repeater wireless station over the wireless connectivity; and based on multiple samples of the received feedback, control transmission of the wireless signals from the repeater wireless station to the user equipment.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
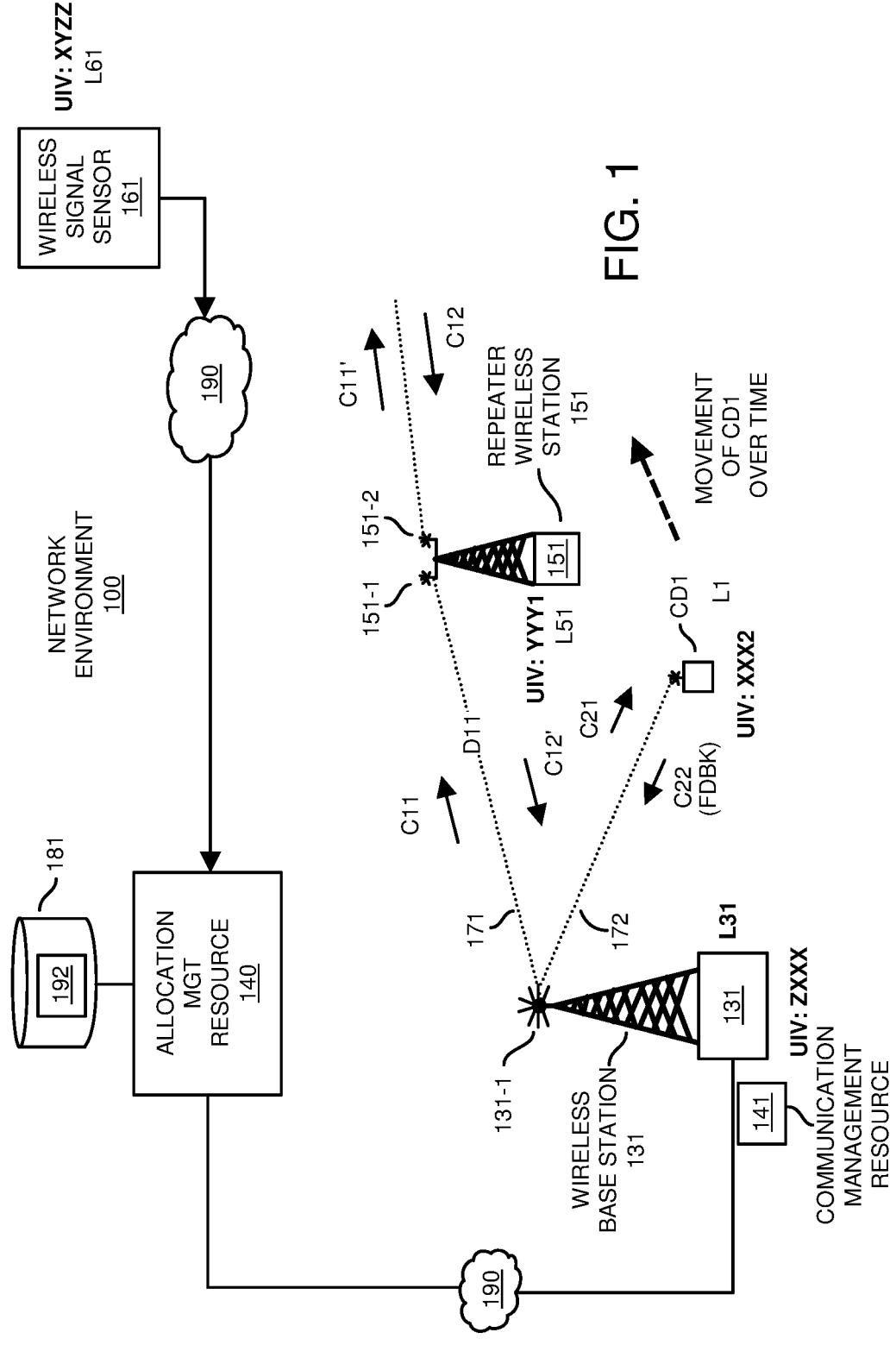
FIG. 1 is an example diagram illustrating a communication environment and implementation of a wireless base station and a repeater wireless station to provide user equipment connectivity to a remote network as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed herein, a communication management resource such as associated with a wireless base station detects wireless connectivity of user equipment (such as a mobile communication device) with a repeater wireless station. The wireless base station transmits communications to a repeater wireless station, the repeater wireless station re-transmits the communications to the user equipment. The communication management resource receives feedback from the user equipment via communications through the repeater wireless station. In one example, the feedback indicates a quality of the user equipment receiving wireless signals transmitted from the repeater wireless station over the wireless connectivity to the user equipment. Based on multiple samples of the received feedback in a window of time, the communication management resource controls transmission of the wireless signals from the repeater wireless station to the user equipment. For example, the wireless base station implements an appropriate modulation coding scheme as derived from the moving window of time of sample channel quality feedback to communicate subsequent communications to the user equipment through the repeater wireless station. The controlled transmission of wireless communications based on the selected modulation coding scheme results in better, more stable throughput of wirelessly communicated data from the repeater wireless station to the user equipment.

Now, more specifically, with reference to the drawings, FIG. 1 is an example diagram illustrating a communication network environment and respective support of wireless connectivity and conveyance of communications according to embodiments herein.

As shown, network environment 100 includes allocation management resource 140 (such as spectrum access system), wireless signal sensor 161, network 190, wireless base station 131, repeater wireless station 151, etc. Wireless network environment 100 includes any number of wireless base stations and any number of corresponding repeater wireless stations.

As further shown, wireless network environment 100 further includes communication management resource 141. Communication management resource 141 can be implemented at any of one or more different locations (such as wireless base station 131, repeater wireless station 151, communication device CD2) in network environment 100 to provide any of the functionality as discussed herein.

Note that each of the resources in network environment 100 can be configured to include or be configured as appropriate hardware, software, or combination of hardware and software to carry out respective operations as discussed herein.

For example, the communication management resource 141 as described herein can be implemented via respective communication management hardware, communication management software, or a combination of communication management hardware and communication management software; the wireless base station 131 as described herein can be implemented via respective wireless base station hardware, wireless base station software, or a combination of wireless base station hardware and wireless base station software; the allocation management resource 140 can be implemented via allocation management hardware, allocation management software, or a combination of allocation management hardware and allocation management software; repeater wireless station 151 can be implemented via repeater wireless station hardware, repeater wireless station software, or a combination of repeater wireless station hardware and repeater wireless station software; communication device CD1 can be implemented via communication device hardware, communication device software, or a combination of communication device hardware and communication device software; and so on.

Further in this example, each of the wireless stations is assigned a respective unique identifier value (such as network address) supporting communication of wireless messages. For example, wireless base station 131 is assigned unique identifier value ZXXX; repeater wireless station 151 is assigned unique identifier value YYY1; communication device CD1 (such as user equipment, mobile communication device, etc.) is assigned XXX2, and so on.

As further shown, each of the wireless base stations in network environment 100 includes respective one or more instances of antenna hardware to wirelessly communicate directly with mobile communication devices (a.k.a., user equipment) and directly with the repeater wireless station 151.

For example, the wireless base station 131 includes one or more instances of antenna hardware 131-1 (such as one or more antenna elements). Note that different sets of the antenna elements associated with the antenna hardware 131-1 can be configured to support different beamforming to transmit first wireless communications and receive second wireless communications in the network environment 100.

In this example embodiment, the wireless base station 131 implements antenna hardware 131-1 to transmit signals C11, C21, etc., to the repeater wireless station 151 and the mobile communication device CD1. The repeater wireless station 151 includes antenna hardware 151-1 (such as one or more antenna elements) to receive communications C11 from the wireless base station 131 and retransmit those communications C11 over antenna hardware 151-2 as wireless communications C11' in the network environment 100. The wireless station 151 includes antenna hardware 151-2 (such as one or more antenna elements) to receive communications C12 from one or more wireless stations in the network environment 100 and transmit (repeat) those communications C12 as communications C12' to the wireless base station 131 and corresponding antenna hardware 131-1. Thus, the repeater wireless station 151 provides wireless connectivity between the wireless base station 131 and any of one or more wireless stations in the network environment 100.

As further shown, the wireless base station 131 can be configured to provide a direct wireless communication link to any wireless stations in the network environment 100. For example, the network environment 100 includes wireless communication link 172 established between the antenna hardware 131-1 of the wireless base station 131 and the user equipment CD1. For example, in a downlink direction, the wireless base station 131 transmits wireless communications C21 over the wireless communication link 172 to the user equipment CD1. In an uplink direction, the wireless base station 131 receives wireless communications C22 over the wireless communication link 172 from the user equipment CD1.

Yet further, the user equipment CD1 moves about the network environment 100. At distances greater than distance D11, the user equipment CD 1 can be configured to hand off a respective wireless communication link 172 to the repeater wireless station 151 as further discussed herein. In such an instance, the repeater wireless station 151 provides an extension of wireless services associated with the wireless base station 131 to one or more mobile communication devices.

Note further that the wireless network environment 100 and corresponding wireless base stations, repeater wireless stations, communication devices, etc., as discussed herein can be configured to support any suitable wireless communication protocols. For example, in one embodiment, each of the wireless stations (i.e., wireless base stations, wireless access points, repeater wireless stations, communication devices, etc.) in network environment 100 can be configured to implement one or more wireless communication protocols such as Wi-Fi™, LTE communications, cellular communications, 4G communications, 5G communications, New Radio (NR), etc.

In still further example embodiments, note that the each of the wireless stations such as wireless base stations, repeater wireless stations, communication devices, etc., can be configured to operate in the CBRS band. For example, in one embodiment, via communications to the allocation management resource 140, each of the one or more wireless stations registers with the allocation management resource 140 (such as a spectrum access system) for allocation of one or more wireless channels to communicate in the network environment 100. In one embodiment, the allocation management resource 140 allocates wireless channel WCH #1 for use by the wireless stations.

In still further example embodiments, the wireless signal sensor 161 detects when an incumbent entity uses a respective one or more wireless channels. The wireless signal sensor 161 notifies the allocation management resource 140 of the incumbent entity and use. For example, in response to detecting use of the wireless channel #1 by the incumbent entity, the allocation management resource 140 revokes use of the wireless channel (such as wireless channel #1) by wireless stations in the network environment 100.

Wireless base station 131 and corresponding communication management resource 141 (such as including circuitry, multiple semiconductor chips, processors, drivers, logic, etc.) control transmission and reception of wireless communications such as signals C11, C12', C21, C21', etc. The wireless signals C11, C11' represent different instances of a same wireless signal C11 transmitted from the wireless base station 131, but in which C11' is potentially phase shifted (time delayed) with respect to the original signal C11.

In accordance with a further example, the wireless base station 131 can be configured to initially communicate in with the allocation management resource 140 to register the wireless base station 131 for use of one or more wireless channels. Assume in this example that the allocation management resource 140 allocates the wireless base station 131 use of wireless channel #1 to support wireless communication links 171, 172, etc.

Note further that the wireless communications C22 received from the user equipment CD1 may include signal quality information indicating a respective quality of the user equipment CD1 receiving wireless communications C21 from the wireless base station 131. In such an instance, the communication management resource 141 can be configured to use the received feedback such as signal quality information to determine a respective appropriate modulation coding scheme in which to transmit communications C21 from the wireless base station to the user equipment CD1. This feedback loop ensures that the communication management resource 141 uses a most efficient modulation coding scheme in which to transmit the communications C21 to the user equipment CD1.

As further discussed herein, note that the selected modulation coding scheme may include control of one or more downlink parameters associated with the communication link 172 such as wireless data rate and/or encoding rate of communicating data over, channel width, and the number of antennas or spatial streams in the device. In one embodiment, the selected modulation coding scheme defines how many useful bits can be transmitted per Resource Element (RE). As previously discussed, modulation coding scheme depends on radio link quality—the better quality of the link between the repeater wireless station 151 and the user equipment CD1, the higher the MCS and the more data can be transmitted. Conversely, the lower the quality of the link between the repeater wireless station 151 and the user equipment CD1, the lower the MCS and the more data can be transmitted.

Further examples below illustrate movement and handoff of the user equipment CD1 to the repeater wireless station 151 and variation in sled modulation coding schemes based on channel quality information feedback from the user equipment CD1.

Figure 2:
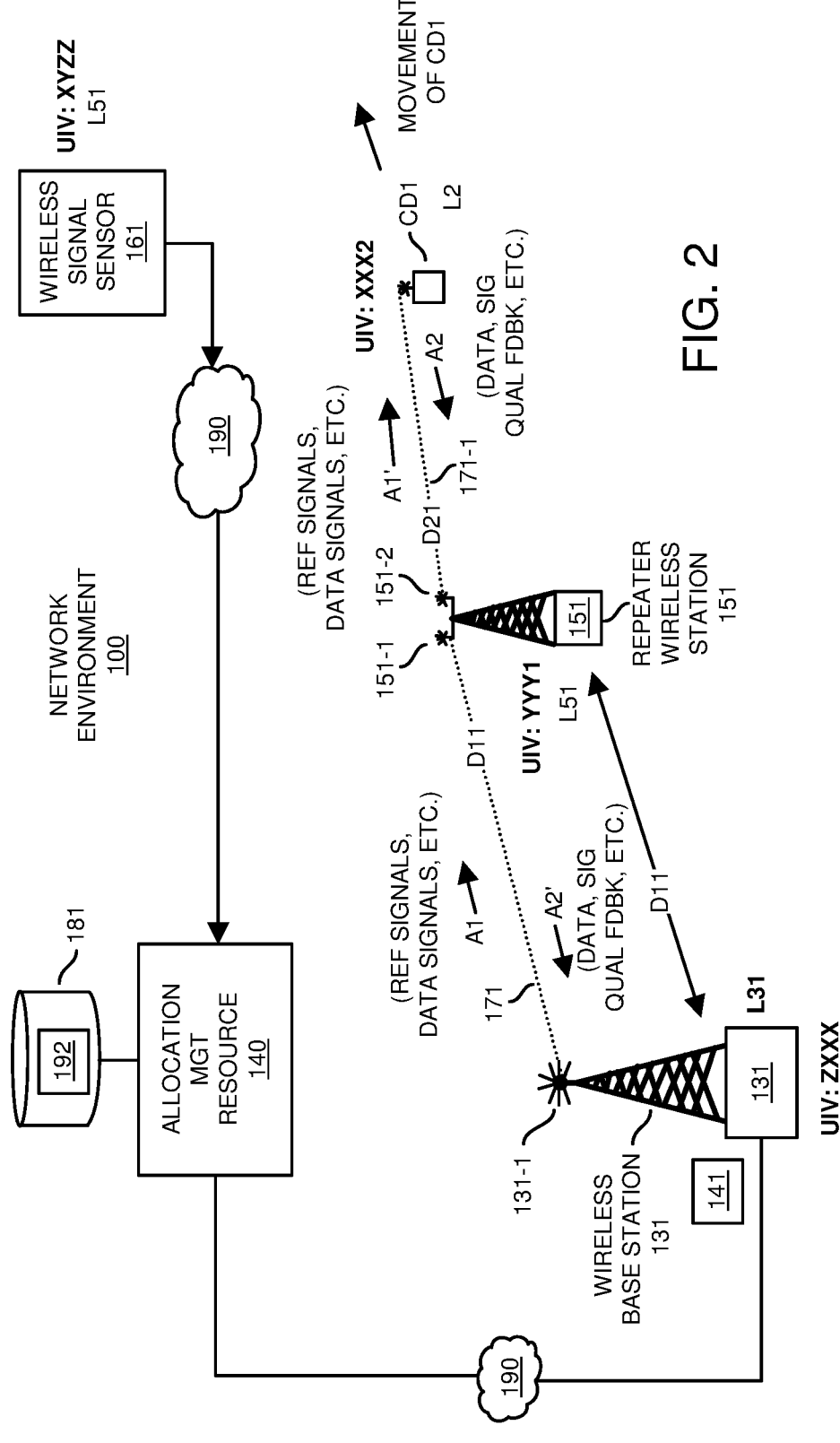
FIG. 2 is an example diagram illustrating a communication environment and implementation of a wireless base station and a repeater wireless station to provide user equipment connectivity to a remote network as discussed herein.

FIG. 2 is an example diagram illustrating a communication environment and implementation of a wireless base station and a repeater wireless station to provide user equipment connectivity to a remote network as discussed herein.

In this example, the user equipment CD1 moves away from the wireless base station 131 such that the communication device CD1 is further than a distance D11 from the wireless base station 131. For example, as previously discussed, the repeater wireless station 151 resides at location L51, which is at a distance D11 with respect to the wireless base station 131. In such an instance, the user equipment CD1 and corresponding repeater wireless station 151 establish wireless communication link 171-1.

Further, in response to the user equipment CD1 moving, the communication management resource 141 such as associated with the wireless base station 131 detects wireless connectivity of the user equipment with the repeater wireless station 151. The movement outside of the range D11 can be determined by the communication management resource 141 in any suitable manner.

For example, detection of the wireless connectivity (wireless communication link 171-1) of the user equipment CD1 with the repeater wireless station 151 may include the communication management resource 141 determining a travel time of conveying a wireless communication between the wireless base station 131 through the repeater wireless station 151 to the user equipment CD1 or a transit time of a wireless communication transmitted from the user equipment CD1 through the repeater wireless station 151 to the wireless base station 131.

The speed at which communications travel over the communication link 171 and communication link 171-1 is known. Based on the transit time from the time of the user equipment CD1 transmitting a wireless communication and a time of the repeater wireless station 151 and/or the wireless base station 131 receiving the wireless communication or replica, the communication management resource is able to determine parameters such as an approximate location of the user equipment CD1 with respect to the repeater wireless station 151 and/or wireless base station 131, distance of the user equipment CD1 with respect to the repeater wireless station 151, distance of the user equipment CD1 from the wireless base station 131, etc.

Note further that the monitored travel time of conveying wireless communications in the uplink or downlink may change over time. Based on repeated determination of travel times associated with the conveyed communications, the communication management resource 141 may determine a change in a distance between the user equipment CD1 and the repeater wireless station 151.

As further shown in this example, subsequent to establishing the wireless connectivity (wireless communication link 171 and wireless communication link 171-1), the wireless base station 131 transmits communications A1 to the repeater wireless station 151; the repeater wireless station 151 re-transmits the communications A1 as wireless communications A1' (such as replica of wireless communications A1) to the user equipment CD1. The wireless base station 131 communicates one or more so-called reference signals at a known power level in the communications A1 to the repeater wireless station 151. The repeater wireless station 151 repeats the reference signals at a known power level in the communications A' to the user equipment CD1.

The user equipment CD1 measures a power level at which the communications A' are received from the repeater wireless station 151 and generates respective feedback information (signal or channel quality information) for each of one or more received reference signals.

The wireless base station 131 and corresponding repeater while station 151 repeatedly transmit the wireless reference signals (such as via communications A1 and communications A1') in the network environment 100. The user equipment CD1 repeatedly measures the transmitted reference signals (and received wireless signals A1') over time and provides corresponding feedback (in communications A2) over time and communicates the generated feedback over communication link 171-1 to the repeater while station 151. The repeater wireless station 151 forwards the communications A2 and corresponding feedback information as communications A2' (replica of communications A2) to the wireless base station 131 in a manner as previously discussed.

Accordingly, via this repeated process, the wireless base station 131 is constantly updated as to a level of quality of the user equipment CD 1 receiving respective communications from the repeater wireless station 151.

Further, as previously discussed, the communication management resource 141 can be configured to determine the distance between the repeater wireless station 151 and the user equipment CD 1 in any suitable manner such as based on a time of flight of corresponding transmitting communications, known location L2 of the communication device CD1 communicated by the communication device CD 1 to the repeater while station 151, etc.

Thus, in accordance with one embodiment, the communication management resource 140 receives feedback in wireless communications A2' from the user equipment via communications through the repeater wireless station. In one example, the feedback indicates a quality of the user equipment receiving wireless signals transmitted from the repeater wireless station over the wireless connectivity to the user equipment.

As further discussed herein, based on multiple samples of the received feedback in a window of time, and/or other information such as a determined distance between the repeater wireless station 151 and the user equipment CD1, the communication management resource 141 controls transmission of the wireless signals A1 from wireless base station 131 and wireless signals A1' to the user equipment CD1. As further discussed below, this can include the communication management resource 131 or communication management resource 141 implementing an appropriate modulation coding scheme as derived from a window of time of the received feedback to communicate subsequent communications to the user equipment CD1 through the repeater wireless station 151. The controlled transmission of wireless communications (such as communications A1 and communications A1') based on the selected modulation coding scheme derived from receiving feedback results in better, more stable throughput of wirelessly communicated data from the replicated wireless signals (A1') communicated from the repeater wireless station 151 to the user equipment CD1.

Figure 3:
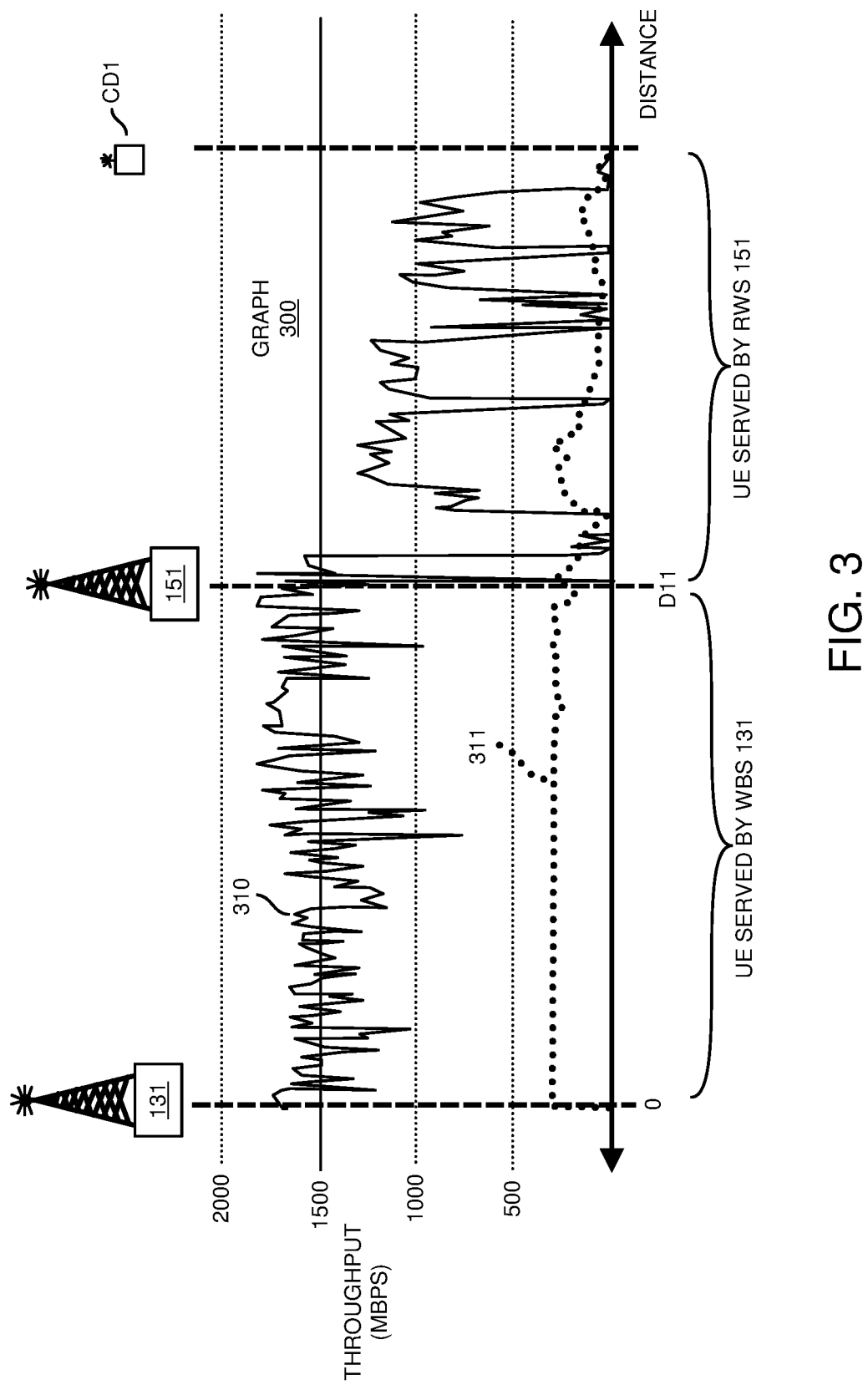
FIG. 3 is an example diagram illustrating a graph of dynamic load throughput (a.k.a., downlink bandwidth or data rate) versus distance of user equipment with respect to a wireless base station or repeater wireless station as discussed herein.

FIG. 3 is an example diagram illustrating a graph of dynamic load throughput (a.k.a., bandwidth) versus distance of user equipment with respect to a wireless base station or repeater wireless station as discussed herein.

Graph 300 indicates a respective data rate throughput in the downlink from the wireless base station 131 and through the user equipment CD1 when the modulation coding scheme used by the wireless base station 131 simply tracks received channel quality information feedback received from the user equipment CD1 without implementing a window of time of analyzing channel quality information feedback as discussed herein. In this example, without implementation of the window of time 450, there is a great amount of variability of the data throughput rate to the user equipment CD1 because the wireless base station 131 selects a corresponding modulation coding scheme to communicate and downlink based on individual samples of the feedback.

More specifically, signal 310 represents undesirable variations in the downlink bandwidth from the wireless base station 131 through the repeater wireless station 151 to the user equipment CD1 for a carrier frequency or bandwidth of around 37 GHz or other suitable value. Signal 311 represents undesirable variations in the downlink bandwidth from the wireless base station 131 through the repeater wireless station 151 to the user equipment CD1 for a carrier frequency of around 3.5 GHz or other suitable value.

Figure 4:
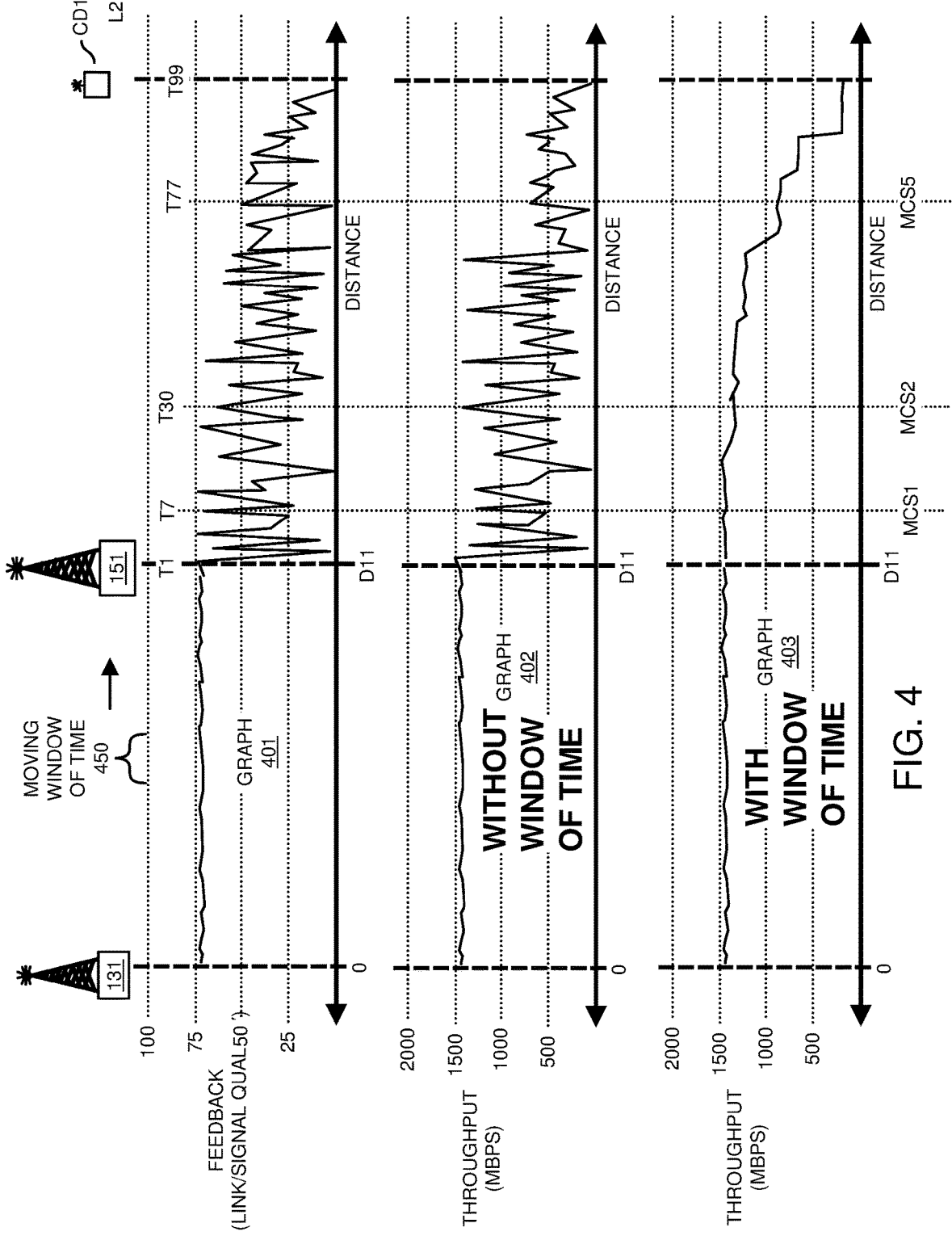
FIG. 4 is an example diagram illustrating link quality feedback and corresponding control of a modulation coding scheme based on the detected link quality feedback as discussed herein.

FIG. 4 is an example diagram illustrating link quality feedback as user equipment moves away from a repeater wireless station and corresponding control of a modulation coding scheme based on the detected link quality feedback as discussed herein.

Graph 401 illustrates implementation of a window of time 450 of receiving feedback (such as channel quality information) in communications A2 from the user equipment CD1 to the repeater wireless station 151 and the same feedback communicated in communications A2' from the repeater wireless station 151 to the wireless base station 131. As previously discussed, the feedback such as channel quality information can be or include any suitable information such as SNIR (signal to noise-interference ratio) of the user equipment CD1 receiving communications from repeater wireless station 151 or any other suitable information (such as channel quality information derived from an RSRQ or power signal strength of the user equipment CD1 receiving the communications from the repeater wireless station 151 in the feedback, FIG. 2). As previously discussed, the information indicates a respective channel quality of the user equipment CD1 receiving respective wireless signals A1' from the repeater wireless station 151.

Graph 402 indicates a respective data rate throughput in the downlink from the wireless base station 131 and through the repeater wireless station 151 to the user equipment CD1 when the modulation coding scheme used by the wireless base station 131 tracks the received feedback without implementing a window of time as discussed herein. In this example, without implementation of the window of time 450, there is a great amount of variability of the data throughput rate from the wireless base station through the repeater wireless station 151 to the user equipment CD1 because the wireless base station 131 selects a corresponding modulation coding scheme to communicate and downlink based on individual samples of the feedback.

Graph 403 indicates a respective smoothed data rate throughput in the downlink from the wireless base station 131 and through the repeater wireless station 151 to the user equipment CD1 when the modulation coding scheme used by the wireless base station 131 is based on a window of time of received channel quality information of multiple samples as discussed herein. In this example, via implementation of the window of time 450, there is a less variability of the data throughput rate to the user equipment CD1 because the wireless base station 131 selects a corresponding modulation coding scheme to communicate in the downlink based on multiple samples of the channel quality information feedback generated by the user equipment CD1 and supplied through the repeater wireless station 151 to the wireless base station 131. As previously discussed, determination of the distance between the repeater wireless station 151 and the user equipment CD1 can be a factor in which to select a respective modulation coding scheme. For example, a higher modulation coding scheme can be selected when the user equipment CD1 is closer to the repeater wireless station 151 and a lower modulation coding scheme can be selected when the user equipment CD1 is farther from the repeater wireless station 151.

Figure 5:
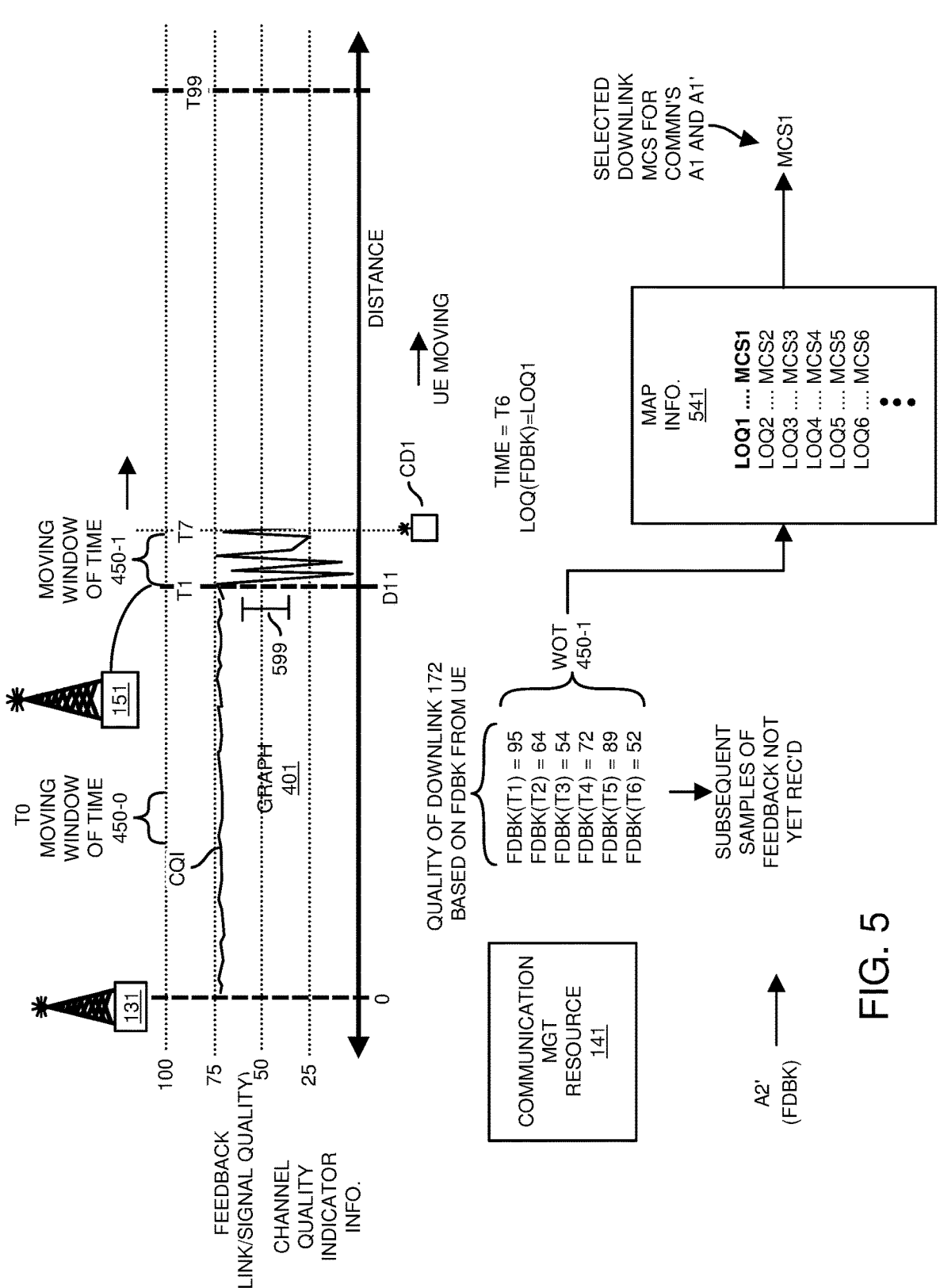
FIG. 5 is an example diagram illustrating processing of a first window of multiple feedback samples indicating a wireless signal quality of the user equipment receiving wireless signals from the repeater wireless station and mapping of a determined level of quality for the first window to a modulation coding scheme for use in a downlink to communicate with the user equipment as discussed herein.

FIG. 5 is an example diagram illustrating processing of a first window of multiple feedback samples indicating a wireless signal quality of the user equipment receiving wireless signals from the repeater wireless station and mapping of a determined level of quality for a first window of channel quality information feedback to a modulation coding scheme for use in a downlink to communicate with the user equipment as discussed herein.

More specifically, in this example, the communication management resource 141 analyzes multiple feedback samples (such as channel quality information or CQI or other suitable information) received in communications A2' from the repeater wireless station 151. Detected high variations in the different samples of feedback within a respective window of time 450-1 (such as a magnitude of the variation of highest and lowest samples or any two samples in the window of time 450-1 being greater than a threshold level or threshold range 599 such as 25 units or other suitable value) indicates to the communication management resource 141 that the user equipment CD1 is now served by the repeater wireless station 151 instead of the wireless base station 131. Around time TO, the wireless base station 131 would otherwise receive a low variation in feedback such as sequence values of 97, 95, 92, 95, 93, and 94 (maximum variation is 5) amongst samples of the feedback within the window of time 450-0 at or around time TO. The low variation indicates that the user equipment CD1 is wirelessly connected to the wireless base station 131. Thus, the feedback signal CQI is relatively stable prior to a handoff of the user equipment CD1 from the wireless base station 131 to the repeater wireless station 151 for a distance less than D11.

As further shown, assume that the feedback (CQI information) in this example indicates a level of quality of the wireless communication link 171-1 between the repeater wireless station 151 and the user equipment CD1: i) where a magnitude of around 0 is the lowest level of quality sample feedback (corresponding to very low magnitude signal-to-noise ratio or signal to interference & noise ratio), ii) where a magnitude of around 50 is a medium level of quality sample feedback (corresponding to a medium magnitude signal-to-noise ratio or signal to interference & noise ratio), and iii) where a magnitude of around 100 is the highest level of quality sample feedback (corresponding to a very high magnitude signal-to-noise ratio or signal to interference & noise ratio).

At or around time T6 or T7, the communication management resource 141 analyzes a window of multiple most recent feedback samples (such as between time T1 and time T6) in the window of time 450-1. The samples of feedback include sequence of values 95, 64, 54, 72, 89, and 52 (maximum variation is 43 indicating connectivity of the user equipment CD1 to the repeater wireless station 151). The feedback samples between time T1 and T6 indicate a high level of variability. The analyzer of communication management resource 141 derives a level of quality feedback value for the sequence. For example, the communication management resource 141 uses the sample magnitudes to produce a level of quality feedback value LOQ(FEED-BACK-T6) for the window of time 450-1 such as LOQ (FEEDBACK-T6)=LOQ1 for the sequence 95, 64, 54, 72, 89, and 52.

Note that the generated LOQ(FEEDBACK) value applied to map information 541 for the window of time 450-1 can be generated in any suitable manner such as via an average value of the sequence of magnitudes, one or more highest or best values in the sequence of magnitudes, etc.

In this example, the highest value is 95 for the sequence so the communication management resource 141 generates the LOQ(FDBK)=LOQ1 corresponding to the highest value or 95 (very good signal strength from the repeater wireless station 151 to the user equipment CD1).

As further shown, via map information 541, the communication management resource 141 maps the determined feedback level of quality for the sequence such as LOQ (FDBK)=LOQ1 in the window of time 450-1 to the modulation coding scheme MCS1. In other words, when the feedback indicates a good signal quality of the user equipment CD1 receiving wireless signals from the repeater wireless station 151, the communication management resource 141 selects a high bit rate (such as modulation coding scheme MCS1) to communicate data in the downlink. For example, subsequent to selection, the communication management resource 141 applies the selected modulation coding scheme MCS1 to the subsequent communications A1 transmitted from the wireless base station 131 to the repeater wireless station 151. The repeater wireless station 151 repeats the communications A1 as replica communications A1' communicated to the user equipment CD1 at the modulation coding scheme MCS1. Thus, the feedback from the user equipment CD1 between time T1 and T6 is used to control which modulation coding scheme is used to communicate in the downlink from the wireless base station 131 through the repeater wireless station 151 to the user equipment CD1. As shown in FIG. 4, selection of the modulation coding scheme MCS1 supports a downlink bandwidth of around 1500 bytes per second from the wireless base station 131 through the repeater wireless station 151 to the user equipment CD1.

As previously discussed, the determined distance between the repeater wireless station 151 and the user equipment CD1 can be used as a basis to select an appropriate mobile communication device to transmit in the downlink. For example, the communication management resource can be configured to map a magnitude of the distance to an appropriate modulation coding scheme used to communicate in the downlink. A higher modulation coding scheme is selected when the user equipment CD1 is closer to the repeater wireless station 151 and a lower modulation coding scheme is selected when the user equipment CD1 is farther from the repeater wireless station 151.

In still further examples, a combination of a determined distance and the received channel quality information generated by the user equipment CD1 can be used as a basis for the communication management resource 140 to select an appropriate modulation coding scheme to implement in the downlink.

Figure 6:
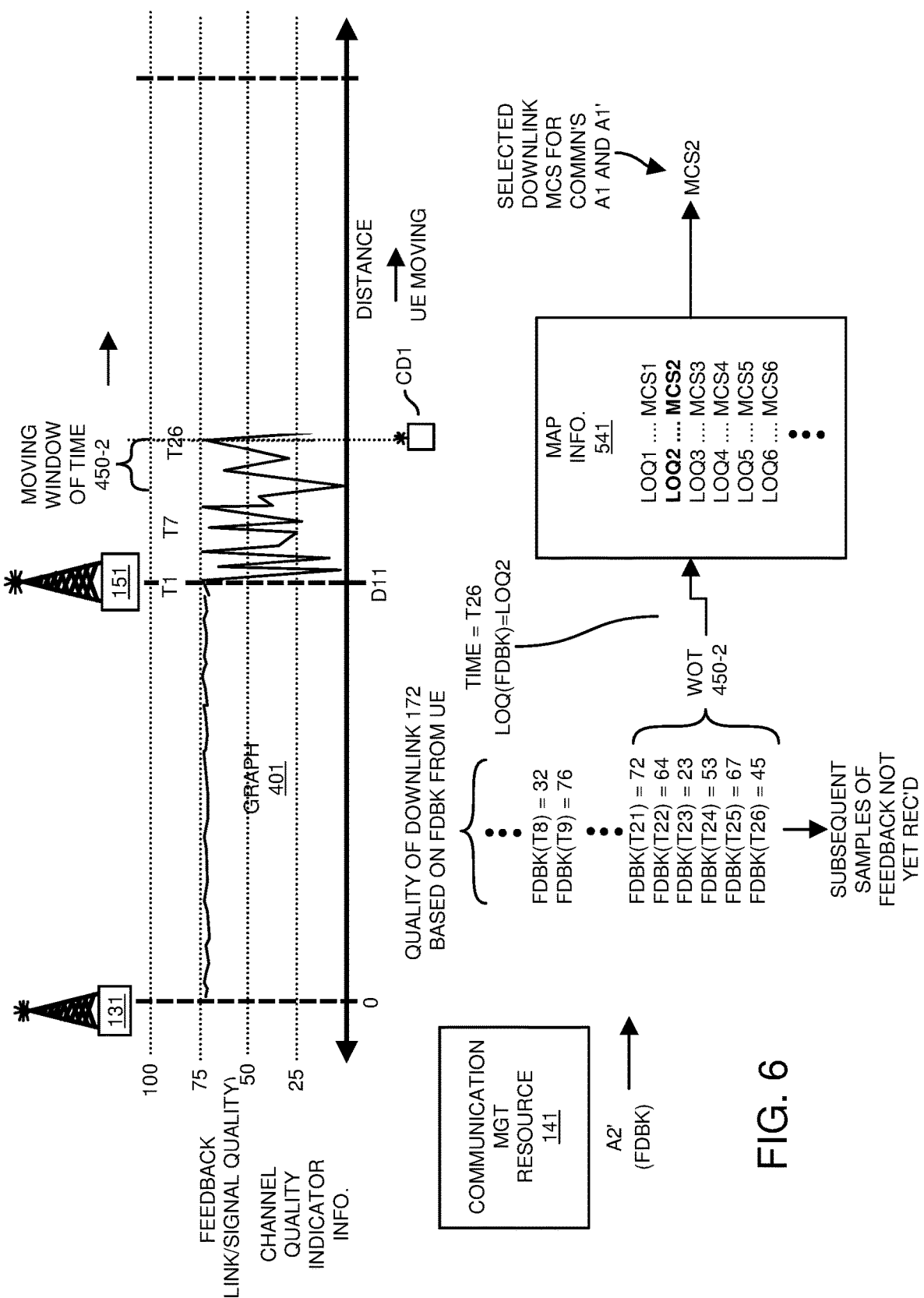
FIG. 6 is an example diagram illustrating processing of a second window of multiple feedback samples indicating a wireless signal quality of the user equipment receiving wireless signals from the repeater wireless station and mapping of a determined level of quality for the second window to a modulation coding scheme for use in a downlink to communicate with the user equipment as discussed herein.

FIG. 6 is an example diagram illustrating processing of a second window of multiple feedback samples indicating a wireless signal quality of the user equipment receiving wireless signals from the repeater wireless station and mapping of a determined level of quality for the second window of channel quality information feedback to a second modulation coding scheme for use in a downlink to communicate with the user equipment as discussed herein.

In this example, the communication management resource 141 analyzes multiple feedback samples (such as channel quality information or CQI or other suitable information) received in communications A2' from the repeater wireless station 151. As previously discussed, detected high variations in the different samples of feedback within a respective window of time 450-2 (such as a magnitude of the variation of highest and lowest samples or any two samples in the window of time 450-2 being greater than a threshold level or threshold range 599 such as 25 units or other suitable value) can be used to detect that the user equipment CD1 is served by the repeater wireless station 151 instead of the wireless base station 131.

At or around sample time T26 or T27, the communication management resource 141 analyzes a window of multiple most recent feedback samples (such as between time T21 and time T26) in the window of time 450-2. The samples of feedback include sequence of values 72, 64, 23, 53, 67, and 45 (maximum variation is 49 indicating connectivity of the user equipment CD1 to the repeater wireless station 151). The feedback samples between time T21 and T26 thus indicate a high level of variability. The analyzer of communication management resource 141 derives a level of quality feedback value for the sequence 72, 64, 23, 53, 67, and 45. For example, the communication management resource 141 uses the sample magnitudes to produce a level of quality feedback value LOQ(FEEDBACK-T26) for the window of time 450-2 such as LOQ(FEEDBACK-T26)=LOQ2 for the sequence 72, 64, 23, 53, 67, and 45.

Note that the generated LOQ(FEEDBACK) value applied to map information 541 for the window of time 450-2 can be generated in any suitable manner such as via an average value of the sequence of magnitudes, one or more highest or best values in the sequence of magnitudes, etc.

In this example, the highest value is 72 for the sequence so the communication management resource 141 generates the LOQ(FDBK)=LOQ2 corresponding to the highest value or 72 (quite good signal strength from the repeater wireless station 151 to the user equipment CD1).

As further shown, via map information 541, the communication management resource 141 maps the determined feedback level of quality for the sequence such as LOQ (FDBK)=LOQ2 in the window of time 450-2 to the modulation coding scheme MCS2. In other words, when the feedback indicates a good signal quality of the user equipment CD1 receiving wireless signals from the repeater wireless station 151, the communication management resource 141 selects a fairly high bit rate (such as modulation coding scheme MCS2) to communicate data in the downlink. For example, subsequent to selection, the communication management resource 141 applies the selected modulation coding scheme MCS2 to the subsequent communications A1 transmitted from the wireless base station 131 to the repeater wireless station 151. The repeater wireless station 151 repeats the communications A1 as replica communications A1' communicated to the user equipment CD1 at the modulation coding scheme MCS2. Thus, the feedback from the user equipment CD1 between time T21 and T26 is used to control which modulation coding scheme is used to communicate in the downlink from the wireless base station 131 through the repeater wireless station 151 to the user equipment CD1. As shown in FIG. 4, selection of the modulation coding scheme MCS2 and corresponding bit rate supports a downlink bandwidth of around 1300 bytes per second from the wireless base station 131 through the repeater wireless station 151 to the user equipment CD1.

Figure 7:
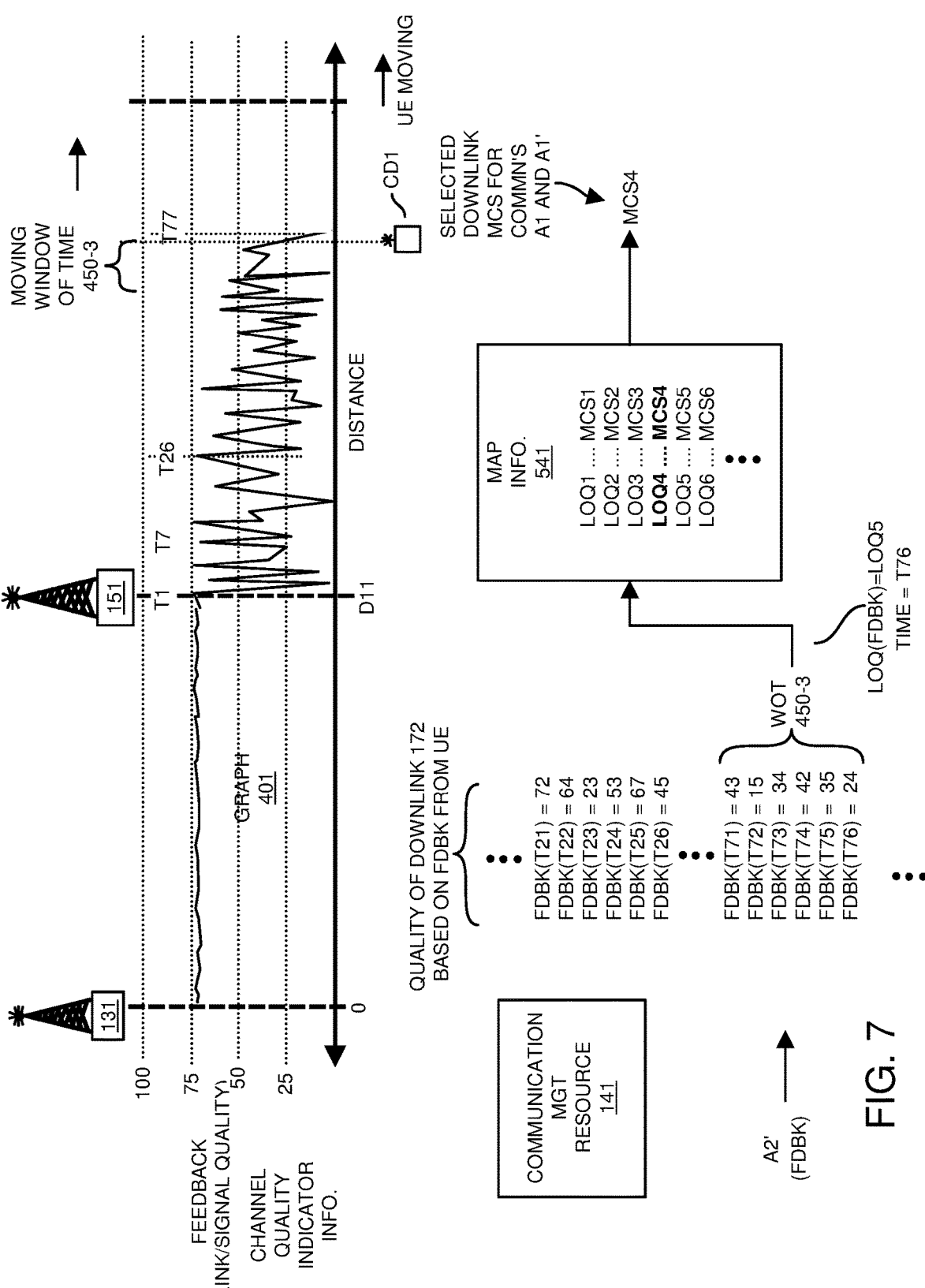
FIG. 7 is an example diagram illustrating processing of a third window of multiple feedback samples indicating a wireless signal quality of the user equipment receiving wireless signals from the repeater wireless station and mapping of a determined level of quality for the third window to a modulation coding scheme for use in a downlink to communicate with the user equipment as discussed herein.

FIG. 7 is an example diagram illustrating processing of a third window of multiple feedback samples indicating a wireless signal quality of the user equipment receiving wireless signals from the repeater wireless station and mapping of a determined level of quality for the third window of channel quality information feedback to a third modulation coding scheme for use in a downlink to communicate with the user equipment as discussed herein.

In this example, the communication management resource 141 analyzes multiple feedback samples (such as channel quality information or CQI or other suitable information) received in communications A2' from the repeater wireless station 151. As previously discussed, detected high variations in the different samples of feedback within a respective window of time 450-3 (such as a magnitude of the variation of highest and lowest samples or any two samples in the window of time 450-3 being greater than a threshold level or threshold range 599 such as 25 units or other suitable value) can be used to detect that the user equipment CD1 is served by the repeater wireless station 151 instead of the wireless base station 131.

At or around sample time T76 or T77, the communication management resource 141 analyzes a window of multiple most recent feedback samples (such as between time T71 and time T76) in the window of time 450-3. The samples of feedback include sequence of values 43, 15, 34, 42, 35, and 24 (maximum variation is 29 indicating connectivity of the user equipment CD1 to the repeater wireless station 151). The feedback samples between time T71 and T76 thus indicate a high level of variability. The analyzer of communication management resource 141 derives a level of quality feedback value for the sequence 43, 15, 34, 42, 35, and 24. For example, the communication management resource 141 uses the sample magnitudes to produce a level of quality feedback value LOQ(FEEDBACK-T76) for the window of time 450-3 such as LOQ(FEEDBACK-T36)=LOQ5 for the sequence 43, 15, 34, 42, 35, and 24.

Note that the generated LOQ(FEEDBACK) value applied to map information 541 for the window of time 450-3 can be generated in any suitable manner such as via an average value of the sequence of magnitudes, one or more highest or best values in the sequence of magnitudes, etc.

In this example, the highest value is 43 for the sequence so the communication management resource 141 generates the LOQ(FDBK)=LOQ5 corresponding to the highest value or 43 (low signal strength from the repeater wireless station 151 to the user equipment CD1).

As further shown, via map information 541, the communication management resource 141 maps the determined feedback level of quality for the sequence such as LOQ (FDBK)=LOQ5 in the window of time 450-3 to the modulation coding scheme MCS5. In other words, when the feedback indicates a good signal quality of the user equipment CD1 receiving wireless signals from the repeater wireless station 151, the communication management resource 141 selects a fairly low bit rate (such as modulation coding scheme MCS5) to communicate data in the downlink. For example, subsequent to selection, the communication management resource 141 applies the selected modulation coding scheme MCS5 to the subsequent communications A1 transmitted from the wireless base station 131 to the repeater wireless station 151. The repeater wireless station 151 repeats the communications A1 as replica communications A1' communicated to the user equipment CD1 at the modulation coding scheme MCS5. Thus, the feedback from the user equipment CD1 between time T71 and T76 is used to control which modulation coding scheme is used to communicate in the downlink from the wireless base station 131 through the repeater wireless station 151 to the user equipment CD1. As shown in FIG. 4, selection of the modulation coding scheme MCS5 and corresponding bit rate supports a downlink bandwidth of around 800 bytes per second from the wireless base station 131 through the repeater wireless station 151 to the user equipment CD1.

Note that, in an opposite manner, the communication management resource 141 can be configured to detect when the user equipment CD1 moves closer to the repeater wireless station 151. In such an instance, the communication management resource 141 detects a higher level of quality associated with the received feedback such as in FIG. 6 and the FIG. 5. As the user equipment CD1 moves closer to the repeater wireless station 151, the communication management resource 141 selects a higher or better modulation coding scheme to provide higher downlink bandwidth.

Figure 8:
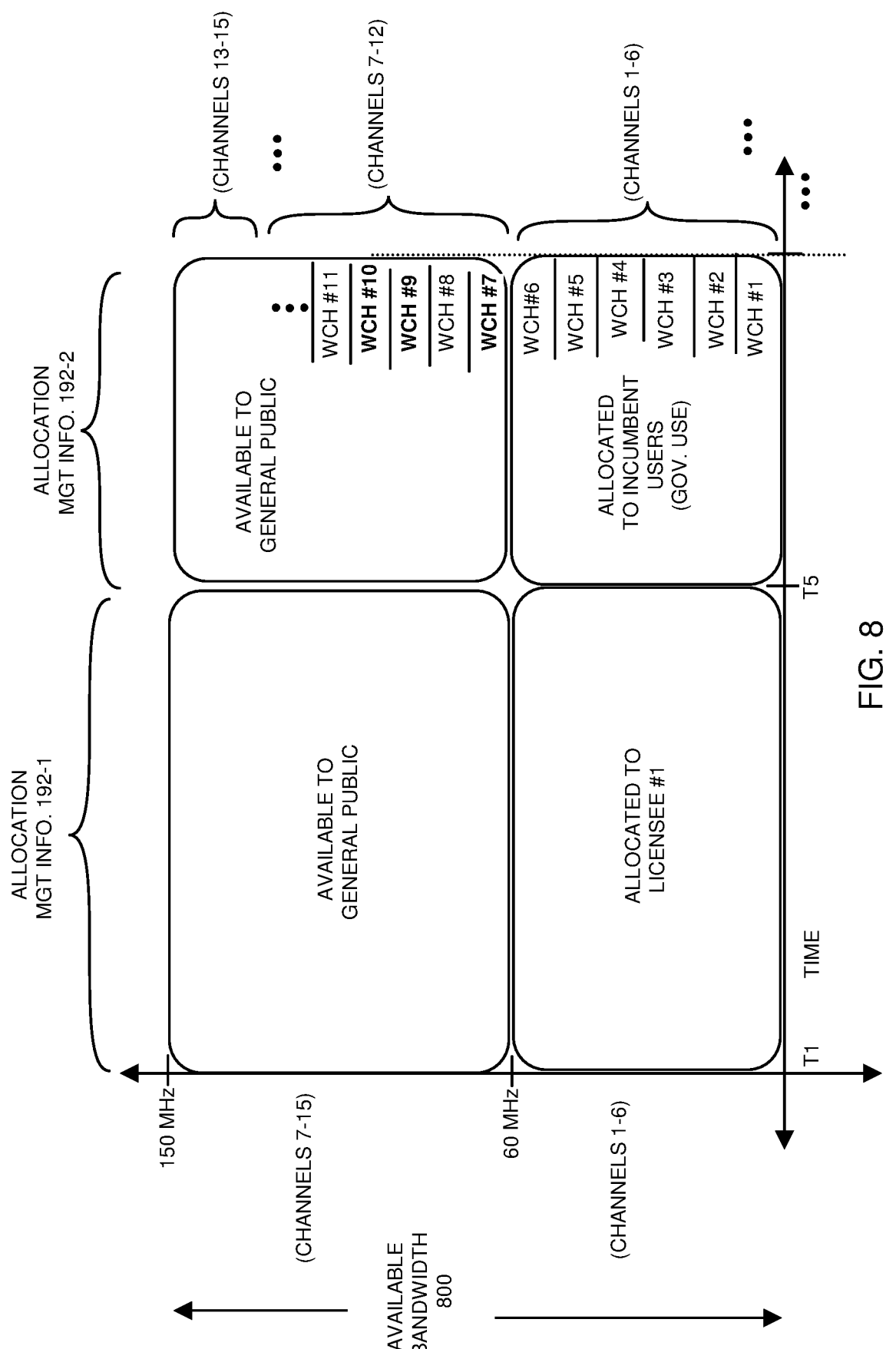
FIG. 8 is an example diagram illustrating a possible wireless spectrum from which wireless channels are allocated and deallocated according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 1-6) of the spectrum by an incumbent user such as the government. In such an instance, the allocation management resource 140 updates the channel allocation information such that the allocation management information 192-2 indicates that only channels 7-15 are allocated as being available to the general authorized access users; channels 1-6 are assigned for use by an incumbent entity requesting use or actually using the channels. Thus, after time T5, the wireless channels 1-6 are no longer available for use by the licensee #1.

In one embodiment, in response to revocation of the allocation of wireless channels 1-6 (or any portion thereof), the communication management resource 140 notifies the wireless base station 131 at or around time T5 that the wireless base station 131 is no longer able to use wireless channel #1 because these channels have been revoked and are used by the incumbent user.

Thus, between time T1 and time T5, the wireless base station 131 and corresponding repeater wireless stations use the wireless channel #1 to provide wireless service to the communication devices. At or around time T5, the communication management resource 140 deallocates use of the wireless channel #1 from the wireless base station 131.

This illustrates the dynamic availability of different wireless channels bandwidth in a hierarchy as shared in network environment 100. For example, if communication management resource 140 allocates use of wireless channels #1-6 in the hierarchy of available channels to any of one or more base stations, communication devices, etc., then the communication management resource 140 must de-allocate use of such wireless channels during conditions in which a higher priority so-called incumbent user relinquishes use of wireless channels 1-6 at or around time T5. In such an instance, as previously discussed, the communication management resource 140 deallocates the wireless channels 1-6 from respective wireless stations for use instead by the incumbent user (higher priority user).

In this example embodiment as previously discussed, the allocation management resource 140 can be configured to allocate use of wireless channel WCH #1 to wireless base station 131 and the repeater wireless stations. In response to detecting a condition that a respective one or more incumbent entity uses the respective wireless channels, the allocation management resource 140 communicates with the wireless base stations to revoke use of such wireless channel. If available, the allocation management resource 140 allocates use of different wireless channels to the wireless base stations. Subsequent to the incumbent entity discontinuing use of the wireless channel #1, the allocation management resource 140 allocates the wireless channel #1 to the wireless base station 131 and corresponding repeater wireless stations.

Figure 9:
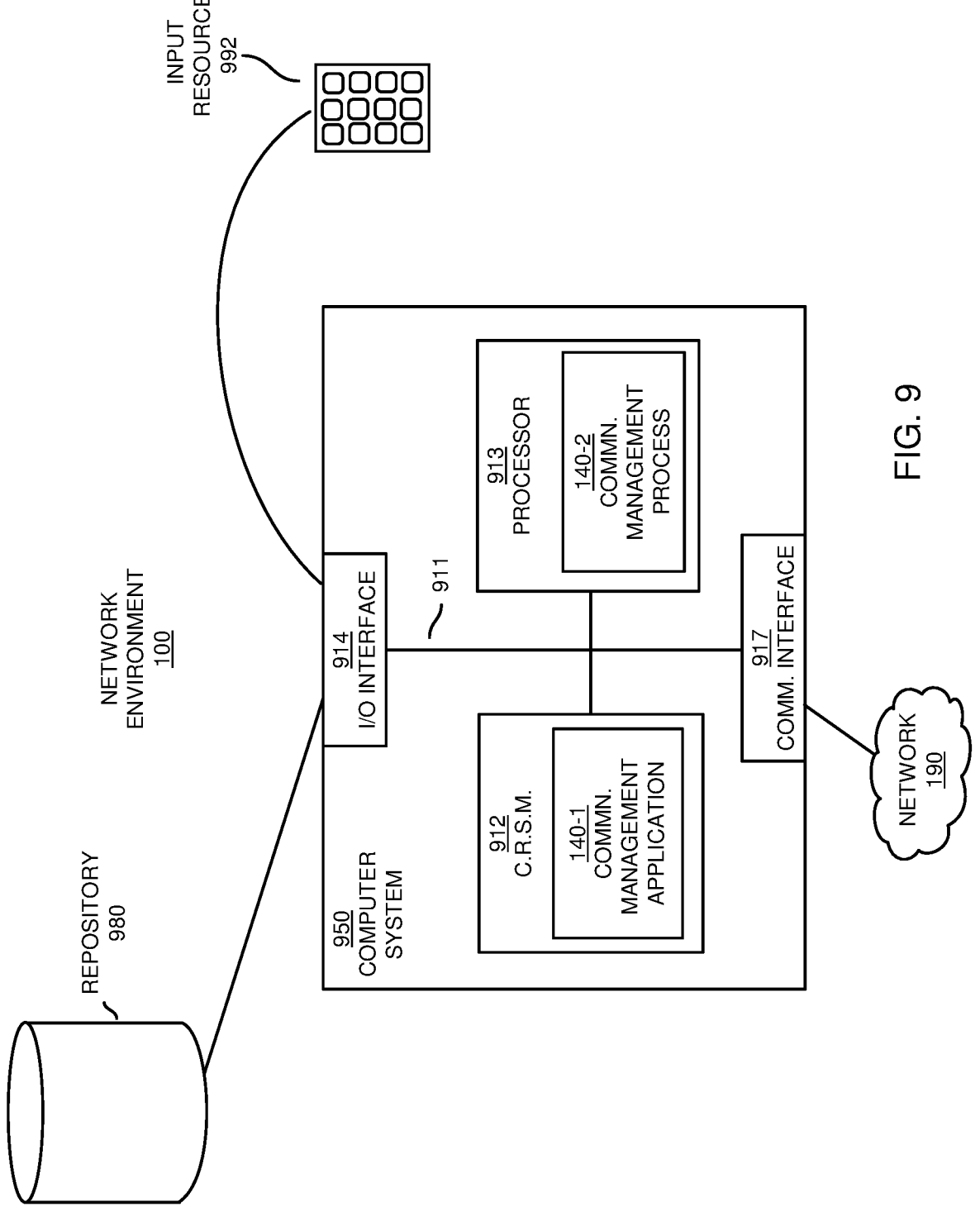
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as wireless stations, communication management resource 140, network management system 141, network management node 142, etc.) as discussed herein can be configured to include computer processor hardware and/or corresponding executable instructions to carry out the different operations as discussed herein via computer system 950.

As shown, computer system 950 of the present example includes an interconnect 911 coupling computer readable storage media 912 such as a non-transitory type of media (or more generally, computer readable hardware which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 (such as computer readable hardware or other suitable entity) can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein. In other words, management application 140-1 can be configured to execute operations associated with network management system 141, network management node 142, customer premises equipment 131, etc.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein. In one embodiment, the control system 950 can include or be implemented in virtualization environments such as the cloud.

Functionality supported by the different resources will now be discussed via flowchart in FIG. 10. Note that the steps in the flowcharts below can be executed in any suitable order.

Figure 10:
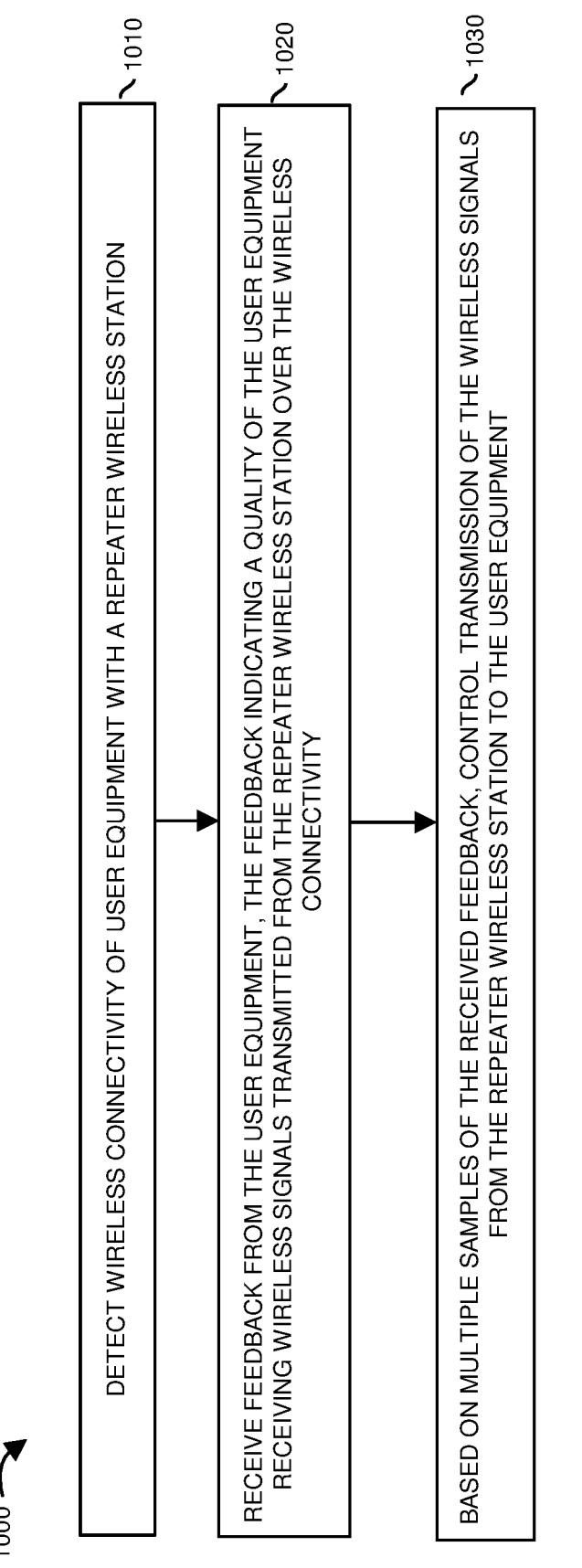
FIG. 10 is an example diagram illustrating a method according to embodiments herein.

FIG. 10 is a flowchart 1000 illustrating an example method according to embodiments. Note that flowchart 1000 overlaps/captures general concepts as discussed herein.

In processing operation 1010, the communication management resource 141 detects wireless connectivity (such as via wireless communication link 172) of user equipment CD1 with the repeater wireless station 151.

In processing operation 1020, the communication management resource 141 receives feedback 210 in wireless communications A2' (such as copy of communications A2 from the user equipment CD1). The feedback 210 indices a quality of the user equipment CD1 receiving wireless signals (such as one or more references wireless signals) transmitted from the repeater wireless station 151 over the wireless connectivity.

In processing operation 1030, based on multiple samples of the received feedback 210, the communication management resource 141 controls transmission of the wireless signals A1 from wireless base station 131 and wireless signals A1' from the repeater wireless station 151 to the user equipment CD1.

Note again that techniques herein are well suited to facilitate more efficient operation of providing network access. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
detecting wireless connectivity of user equipment with a repeater wireless station;
receiving feedback from the user equipment, the feedback indicating a quality of the user equipment receiving first wireless signals transmitted from the repeater wireless station over the wireless connectivity in a window of time;
based on multiple samples of the received feedback, controlling transmission of second wireless signals from the repeater wireless station to the user equipment; and
wherein controlling transmission of the second wireless signals includes: i) analyzing first samples of the feedback; and ii) controlling transmission of communications from a wireless base station through the repeater wireless station to the user equipment based on the first samples of the feedback.

2. The method as in claim 1, wherein controlling transmission of the second wireless signals from the repeater wireless station includes controlling a modulation coding scheme of transmitting the second wireless signals from the repeater wireless station.

3. The method as in claim 2, wherein controlling the modulation coding scheme of transmitting the second wireless signals from the repeater wireless station includes:
transmitting wireless communications from the wireless base station in accordance with the modulation coding scheme, the repeater wireless station operative to repeat transmission of the wireless communications as the second wireless signals.

4. The method as in claim 1, wherein controlling transmission of the second wireless signals from the repeater wireless station to the user equipment includes:
selecting a modulation coding scheme in which to transmit wireless communications from the wireless base station, the repeater wireless station operative to repeat transmission of the wireless communications as the second wireless signals.

5. The method as in claim 1 further comprising:
adjusting a modulation coding scheme associated with the second wireless signals transmitted from the repeater wireless station in response to detecting that variations in magnitudes of the multiple samples of the received feedback are above a threshold level.

6. The method as in claim 1, wherein the feedback varies based on a signal to noise ratio associated with the user equipment receiving the first wireless signals transmitted from the repeater wireless station over the wireless connectivity.

7. The method as in claim 1, wherein detecting the wireless connectivity of the user equipment with the repeater wireless station includes:

determining a travel time of conveying a wireless communication from the wireless base station through the repeater wireless station to the user equipment, the wireless communication conveyed over a communication path including the repeater wireless station and the wireless connectivity.

8. The method as in claim 7 further comprising:

based on the determined travel time, determining a change in a distance between the user equipment and the repeater wireless station.

9. The method as in claim 1, wherein the window of time is a moving window of time.

10. The method as in claim 1, wherein the second wireless signals transmitted from the repeater wireless station are a replica of first wireless communications transmitted from the wireless base station to the repeater wireless station.

11. The method as in claim 10, wherein controlling the transmission of the second wireless signals from the repeater wireless station includes:

selecting a modulation coding scheme in which to transmit the first wireless communications based on the received feedback.

12. The method as in claim 1, wherein the feedback indicates at least one wireless power level associated with the user equipment receiving the first wireless signals in the window of time.

13. A method comprising:

detecting wireless connectivity of user equipment with a repeater wireless station;

receiving feedback from the user equipment, the feedback indicating a quality of the user equipment receiving first wireless signals transmitted from the repeater wireless station over the wireless connectivity;

based on multiple samples of the received feedback, controlling transmission of second wireless signals from the repeater wireless station to the user equipment; and wherein the multiple samples of the received feedback indicate a change, over time, in a signal to noise ratio of the user equipment receiving the first wireless signals from the repeater wireless station.

14. A method comprising:

detecting wireless connectivity of user equipment with a repeater wireless station;

receiving feedback from the user equipment, the feedback indicating a quality of the user equipment receiving first wireless signals transmitted from the repeater wireless station over the wireless connectivity in a window of time; and based on multiple samples of the received feedback, controlling transmission of second wireless signals from the repeater wireless station to the user equipment;

wherein controlling transmission of the second wireless signals from the repeater wireless station to the user equipment includes:

selecting a modulation coding scheme based on the multiple samples of the received feedback; and transmitting wireless communications from a wireless base station in accordance with the selected modulation coding scheme, the repeater wireless station operative to repeat the wireless communications received from the wireless base station as the second wireless signals transmitted from the repeater wireless station to the user equipment.

15. A system comprising:

communication management hardware operative to:

detect wireless connectivity of user equipment with a repeater wireless station;

receive feedback from the user equipment, the feedback indicating a quality of the user equipment receiving first wireless signals transmitted from the repeater wireless station over the wireless connectivity;

based on multiple samples of the received feedback, control transmission of second wireless signals from the repeater wireless station to the user equipment; and wherein the communication management hardware is further operative to: analyze first samples of the feedback associated with the user equipment receiving the first wireless signals, the first wireless signals being transmitted from the repeater wireless station to the user equipment in a window of time, and control transmission of communications from a wireless base station through the repeater wireless station to the user equipment based on the first samples of the feedback.

16. The system as in claim 15, wherein the communication management hardware is further operative to:

control a modulation coding scheme of communicating the second wireless signals from the repeater wireless station; and transmit wireless communications from the wireless base station in accordance with the modulation coding scheme, the repeater wireless station operative to repeat transmission of the wireless communications as the second wireless signals.

17. The system as in claim 15, wherein the communication management hardware is further operative to:

based on the received feedback, select a modulation coding scheme in which to transmit wireless communications from the wireless base station, the repeater wireless station operative to repeat transmission of the wireless communications as the second wireless signals.

18. The system as in claim 15, wherein the communication management hardware is further operative to:

adjust a modulation coding scheme associated with the second wireless signals in response to detecting that variations in magnitudes of the multiple samples of the received feedback is above a threshold level.

19. The system as in claim 15, wherein the feedback varies based on a signal to noise ratio associated with the user equipment receiving a wireless message from the repeater wireless station over the wireless connectivity.

20. The system as in claim 15, wherein the multiple samples of the received feedback indicate a change, over time, in a signal to noise ratio of the user equipment receiving the first wireless signals from the repeater wireless station.

21. The system as in claim 15, wherein the communication management hardware is further operative to:

determine a travel time of conveying a wireless communication from the wireless base station through the repeater wireless station to the user equipment, the wireless communication conveyed over a communication path including the repeater wireless station and the wireless connectivity.

22. The system as in claim 21, wherein the communication management hardware is further operative to:

based on the travel time, determine a change in a distance between the user equipment and the repeater wireless station.

23. The system as in claim 15, wherein the communication management hardware is further operative to:

select a modulation coding scheme based on the multiple samples of the received feedback, the received feedback indicating the quality of the user equipment receiving the first signals transmitted from the repeater wireless station over the wireless connectivity in a window of time; and transmit wireless communications from the wireless base station in accordance with the selected modulation coding scheme, the repeater wireless station operative to repeat the wireless communications received from the wireless base station as the second wireless signals transmitted from the repeater wireless station to the user equipment.

24. A method comprising:

detecting wireless connectivity of user equipment with a repeater wireless station;

receiving feedback from the user equipment, the feedback indicating a quality of the user equipment receiving first wireless signals transmitted from the repeater wireless station over the wireless connectivity in a window of time;

based on multiple samples of the received feedback, controlling transmission of second wireless signals from the repeater wireless station to the user equipment; and wherein the feedback is first feedback;

wherein the window of time is a first window of time, the method further comprising:

receiving second feedback from the user equipment, the second feedback indicating a quality of the user equipment receiving the second wireless signals transmitted from the repeater wireless station over the wireless connectivity in a second window of time; and based on multiple samples of the received second feedback, controlling transmission of third wireless signals from the repeater wireless station to the user equipment.

25. The method as in claim 24, wherein the second window of time occurs later than the first window of time.

26. The method as in claim 25, wherein controlling the transmission of the second wireless signals includes the repeater wireless station transmitting the second wireless signals using a first modulation coding setting; and wherein controlling the transmission of the third wireless signals includes the repeater wireless station transmitting the third wireless signals using a second modulation coding setting.

27. The method as in claim 26, wherein the second modulation coding setting supports a lower bit rate of transmitting data than the first modulation coding setting.

* * * * *